Jan. 28, 1964  P. F. JACOBS  3,119,538
FORM-EJECTING MACHINE
Filed Dec. 18, 1961  5 Sheets-Sheet 1
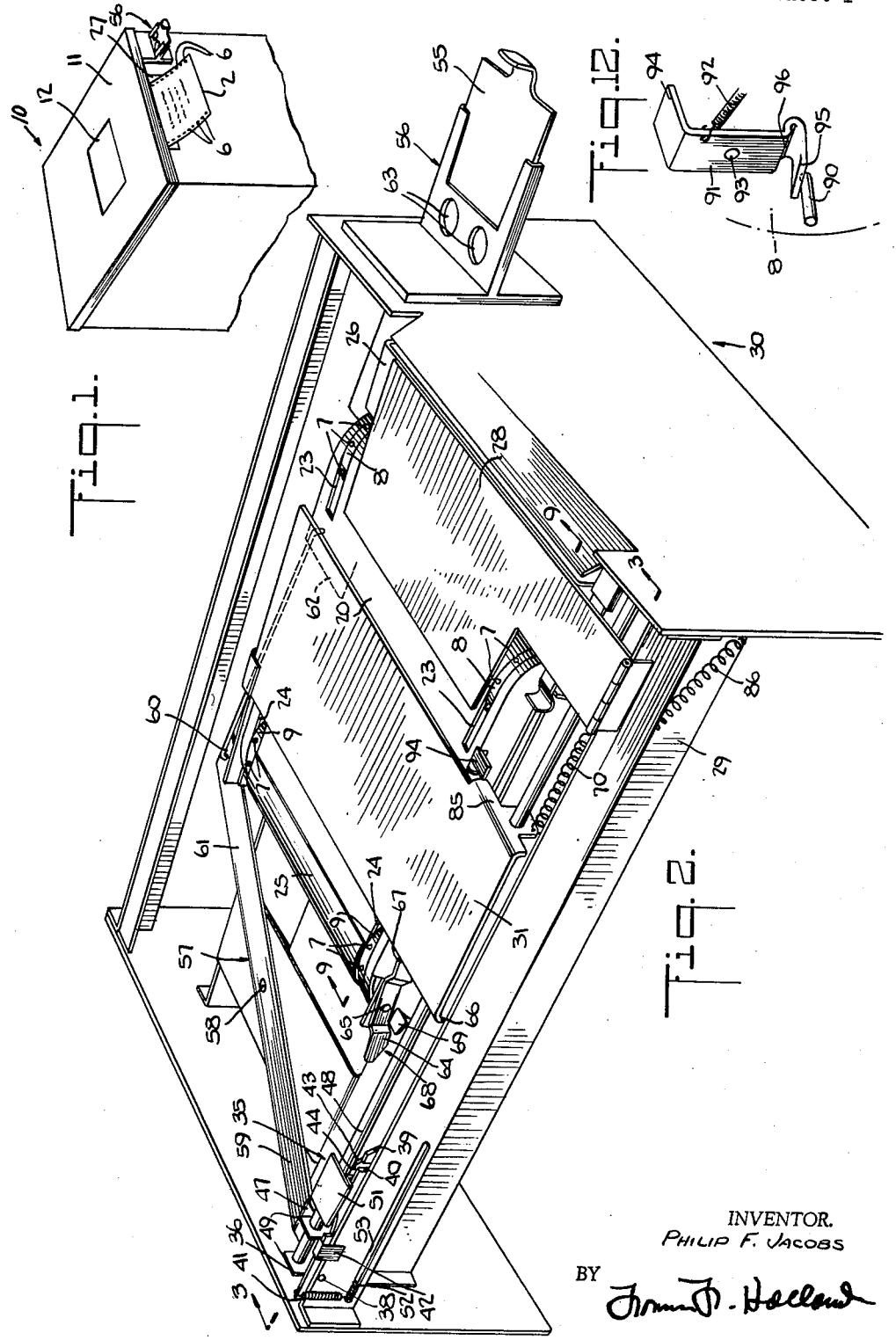
INVENTOR.
PHILIP F. JACOBS
BY
Thomas D. Holland
ATTORNEY

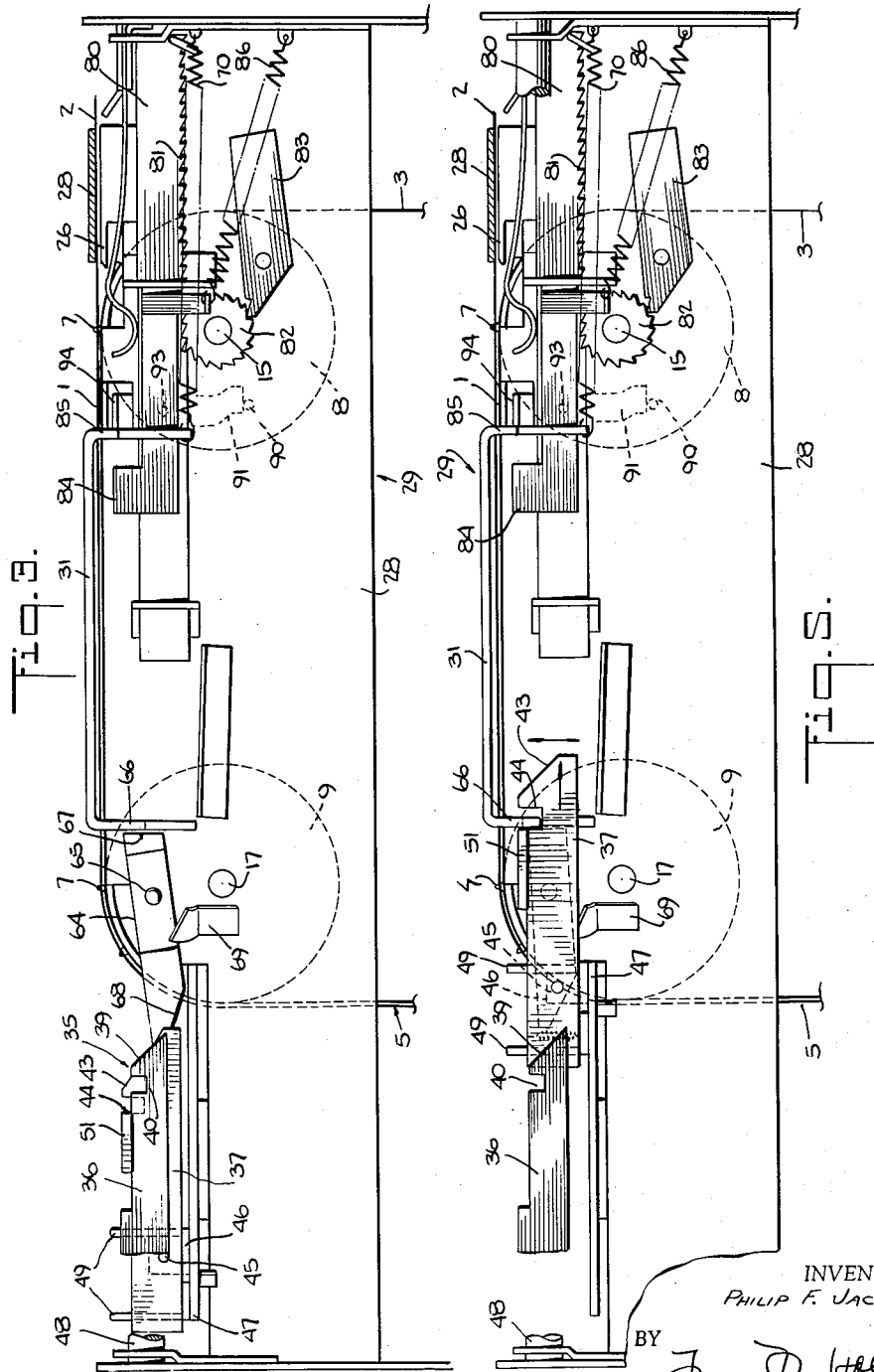

Jan. 28, 1964  P. F. JACOBS  3,119,538
FORM-EJECTING MACHINE
Filed Dec. 18, 1961  5 Sheets-Sheet 3
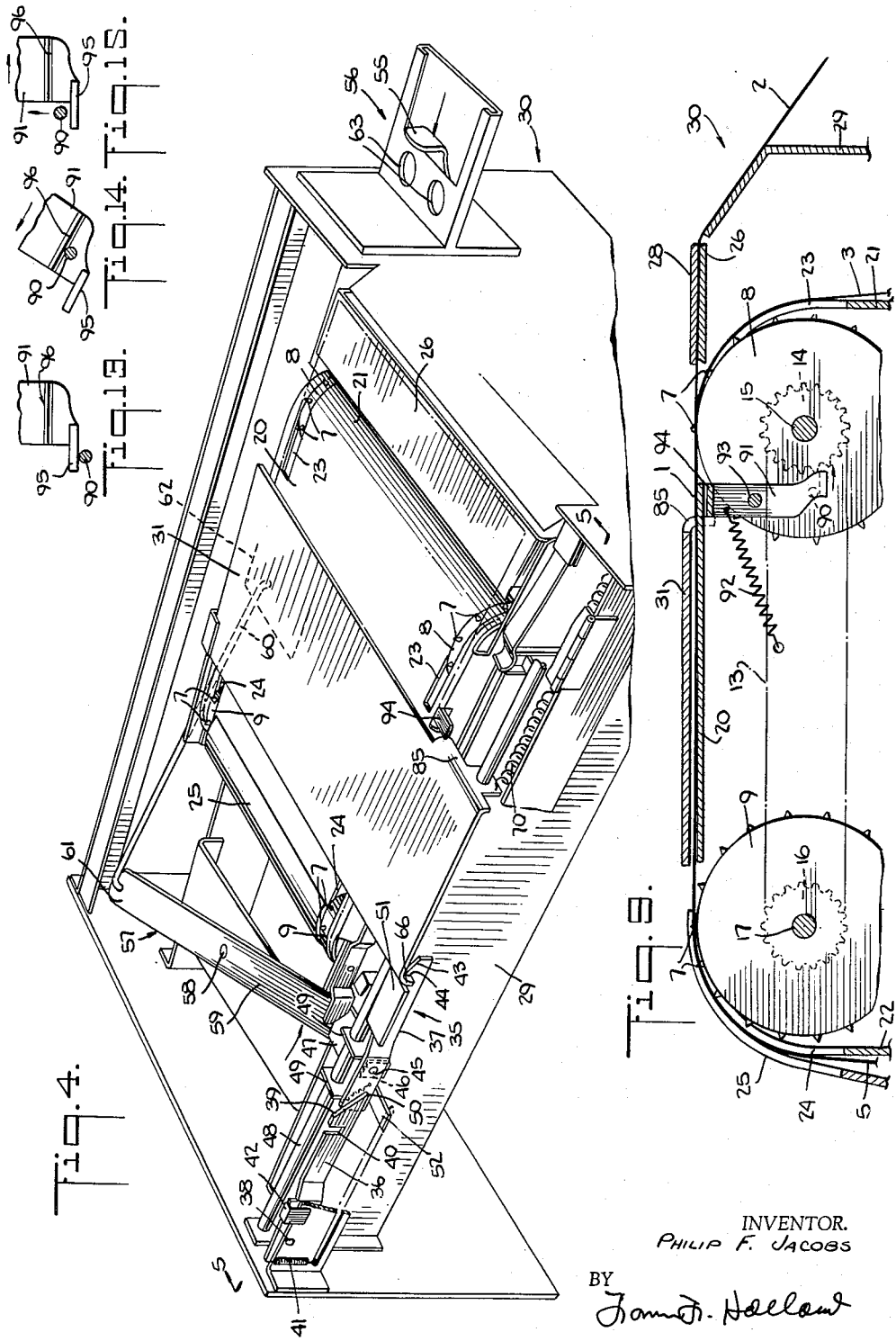
INVENTOR.
PHILIP F. JACOBS
BY
James F. Holland
ATTORNEY

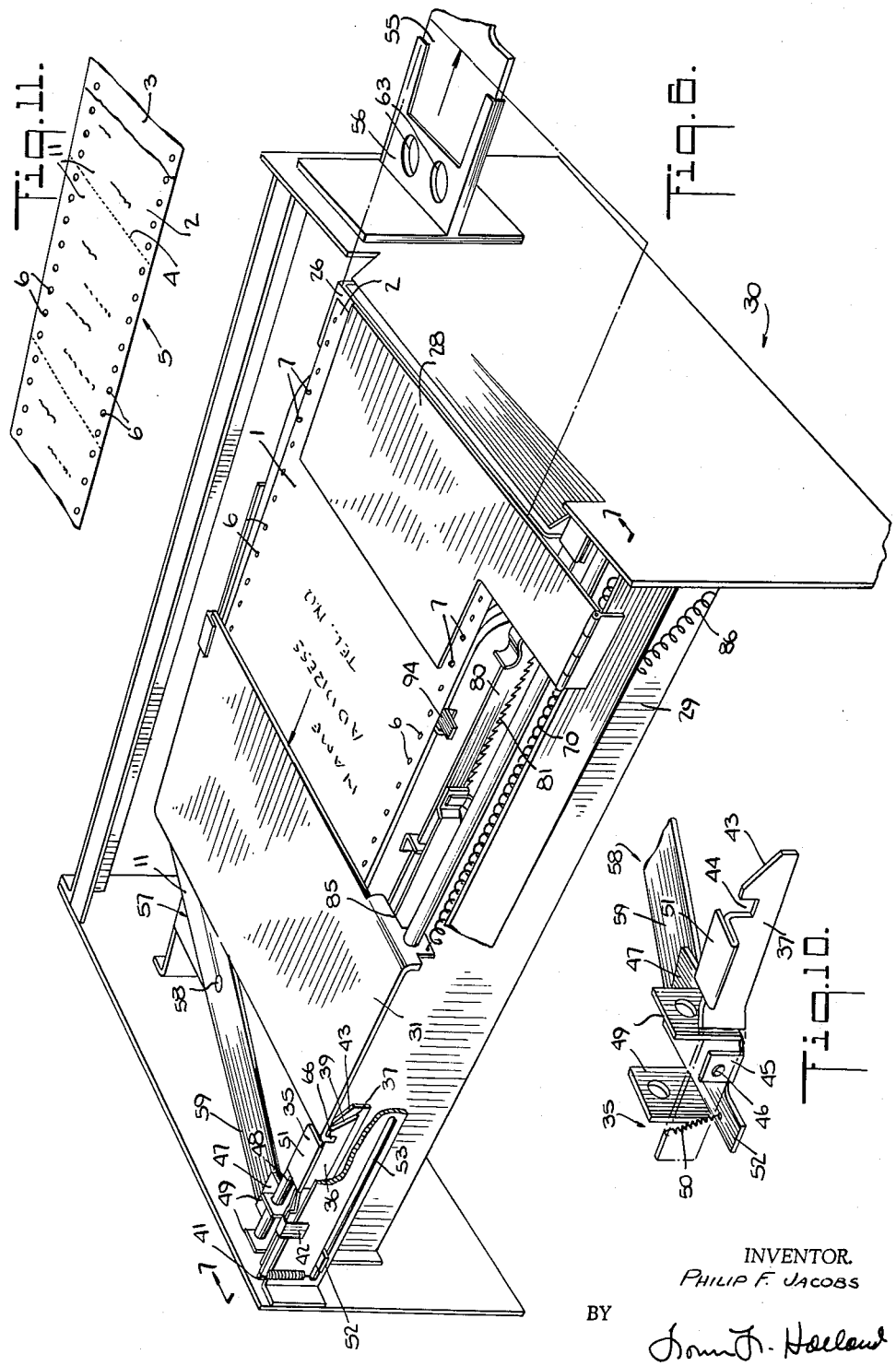

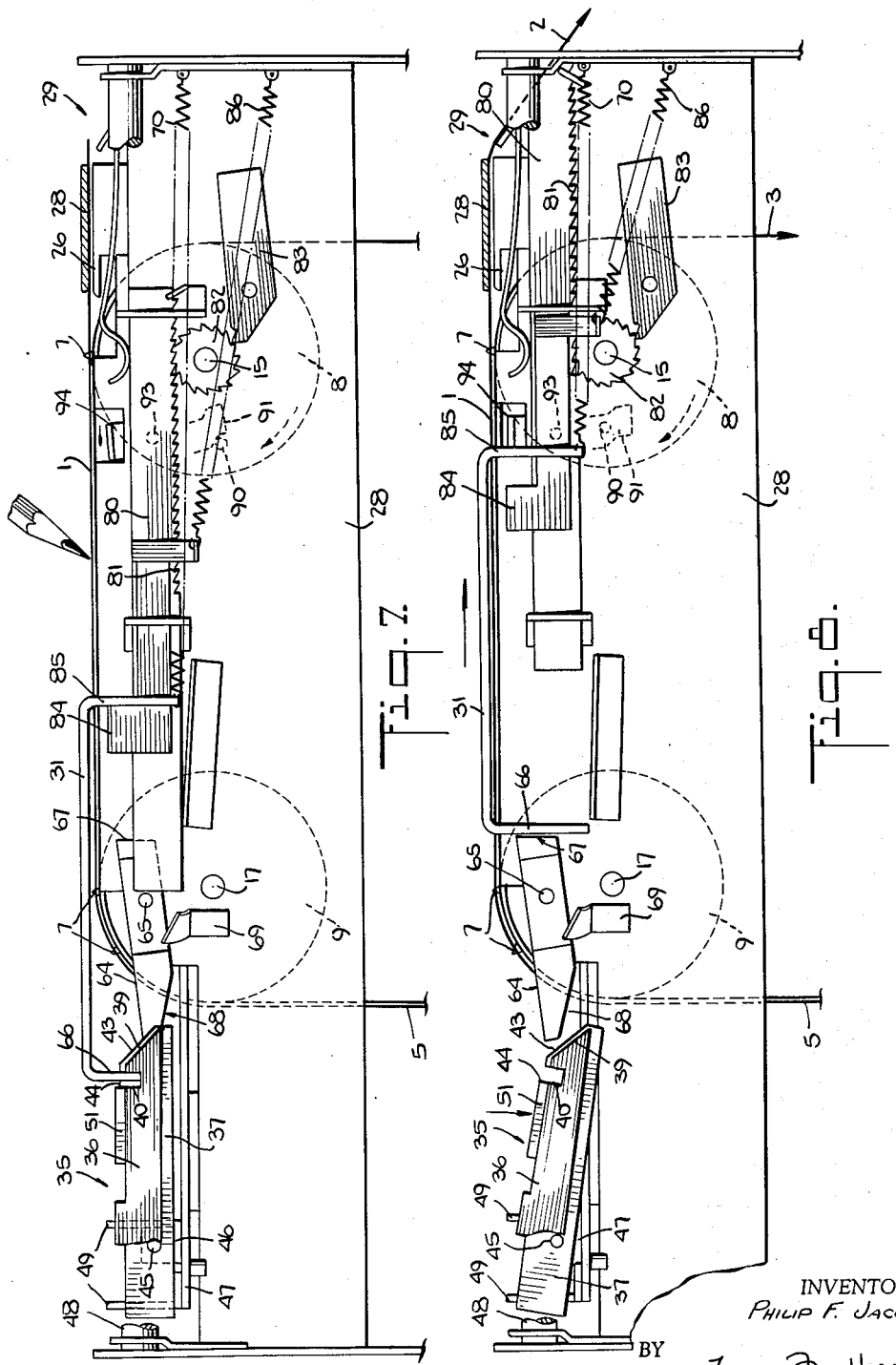

3,119,538
FORM-EJECTING MACHINE
Philip F. Jacobs, Old Brookville, N.Y., assignor to Secure-Ur-Trip Inc., New York, N.Y., a corporation of New York
Filed Dec. 18, 1961, Ser. No. 160,060
15 Claims. (Cl. 226—157)

The present invention relates to an improved form-ejecting machine and more particularly to an improved insurance vending machine.

It has become common practice for travel insurance to be sold to travelers from vending machines which are stationed at airline terminals, bus terminals, hotels, etc. Such vending machines are operated by inserting a coin into the machine to expose the insurance policy. The purchaser writes his name and address and any other pertinent information required by the policy and then presses a suitable release mechanism which ejects a copy of the policy out of the machine for the purchaser's record and retains a copy of the policy for the records of the insurance company.

Insurance vending machines in use today are usually operated electrically so that their manufacture is usually expensive, because of the electrical components required, and their maintenance is also expensive. Furthermore, when some fault occurs in such machines, the whole machine must be removed from its location and returned to the repair shop with a resulting loss of revenue.

The present invention overcomes these defects and has for one of its objects the provision of an improved insurance vending machine which operates mechanically.

Another object of the present invention is the provision of an improved insurance vending machine which does not require expensive maintenance.

Another object of the present invention is the provision of an improved insurance vending machine which may be easily and inexpensively manufactured.

Another object of the present invention is the provision of an improved insurance vending machine in which the mechanical unit of any defective machine can be easily removed from the machine for repair and replaced with an operative unit so that it is unnecessary to remove a machine from location because of defective operation.

Other and further objects of the invention will be obvious upon an understanding of the illustrative embodiment about to be described or will be indicated in the appended claims, and various advantages not referred to herein will occur to one skilled in the art upon employment of the invention in practice.

For convenience the present invention is being described in connection with an insurance vending machine. However, it will be understood that the invention may be used with any other type of form-ejecting machines wherein information is written on a sheet and the sheet is ejected. It will further be understood that the terms "insurance," "policy," and "insurance vending machine" are used herein for convenience and are intended to include other analogous structures.

A preferred embodiment of the invention has been chosen for purposes of illustration and description and is shown in the accompanying drawings, forming a part of the specification, wherein:

FIG. 1 is a perspective view of the outside of an insurance vending machine made in accordance with the present invention;

FIG. 2 is a perspective view of the inner mechanical operating unit of the machine showing the position of the parts when the machine is in the inoperative position;

FIG. 3 is a sectional view taken along line 3—3 of FIG. 2;

FIG. 4 is a perspective view similar to FIG. 2 showing the position of the parts when coins are initially inserted into the machine through a coin chute;

FIG. 5 is a sectional view taken along line 5—5 of FIG. 4;

FIG. 6 is a perspective view similar to FIG. 2 showing the position of the parts when the machine is in its operative position;

FIG. 7 is a sectional view taken along line 7—7 of FIG. 6;

FIG. 8 is a sectional view similar to FIG. 7 showing the position of the parts after the release mechanism has been actuated;

FIG. 9 is a sectional view taken along line 9—9 of FIG. 2 showing the policy-advancing rollers;

FIG. 10 is a detailed perspective view showing the release mechanism;

FIG. 11 is a perspective view showing one type of insurance policy which may be used with the present invention;

FIG. 12 is a perspective view of a wheel stop mechanism used with the present invention;

FIG. 13 is an elevational view of the wheel stop mechanism in its first stop position;

FIG. 14 is an elevational view of the wheel stop mechanism in its second stop position; and FIG. 15 is an elevational view of the wheel stop mechanism in its wheel releasing position.

Referring to the drawings and more particularly to FIG. 11, the insurance policy 1 which may be used with the present invention comprises an original copy 2 and a carbon copy 3 between which is located a sheet of carbon paper (not shown). Each of the policies 1 are joined to each other by a tear line 4 so that all the policies may be assembled on a single continuous strip 5 and dispensed one by one by tearing along the tear line 4. A plurality of spaced perforations 6 are located along the outer edges of the strip 5 which are adapted to cooperate with pins 7 on front feed wheels 8 and rear feed wheels 9 to permit the policies to be advanced when the wheels 8 and 9 are rotated, as will be more fully discussed hereinafter.

Referring more particularly to FIG. 1, the machine of the present invention comprises an outer casing 10 having a top wall 11 with a window 12 therein beneath which passes the insurance policies 1. The top wall 11 is removable to give access to the operating unit 30 (FIG. 2) and to permit the operating unit to be easily positioned in the outer casing 10. It will of course, be understood that the shape of the outer casing 10 may be modified as desired.

Each policy 1 is moved beneath the window 12 by front and rear feed wheels 8 and 9 which are operatively connected to each other by a chain 13 (FIG. 9) meshing with front gear 14 mounted on front wheel shaft 15 journalled in frame 29 of operating unit 30 to which the front feed wheels 8 are mounted and rear gear 16 mounted on wheel shaft 17 journalled on frame 29 to which the rear feed wheels 9 are mounted. The pins 7 on the front and rear feed wheels 8 and 9 are adapted to be inserted into the perforations 6 along the edge of the policies 1 so that when the feed wheels 8 and 9 are rotated the policies 1 will be moved forward.

The policies 1 are moved over a writing plate 20 which lies beneath writing window 12 and which has curved front and rear portions 21 and 22 having spaced elongated slots 23 and 24 therein to permit the pins 7 of the feed wheels 8 and 9 to protrude therethrough. A rear curved plate 25 positively positions the insurance policy sheet 5 against the rear feed wheel 9 and a front separator plate 26 separates the carbon copy 3, which remains within the machine, from the original copy 2, which is ejected from the machine through a mouth 27 (FIG. 1). A pivotally mounted front clamp plate 28 located above separator plate 26 directs the original copy 2 of the polcy toward the mouth 27.

In general the operating unit 30 comprises a masking plate 31 located above policy 1 which is movable from a forward policy-masking position, as shown in FIG. 3, to a rear policy-exposing position, as shown in FIG. 6. When the masking plate 31 is in its rearward exposing position the policy 1 beneath window 12 is exposed so that the purchaser can write his name, address, etc. thereon. When the masking plate 31 is moved forward to the masking position (FIG. 3), the feed wheels 8 and 9 are also moved forward to move the written policy out of the machine and advance the strip 5 to position a blank policy beneath the window 12. Simultaneously, the masking plate covers the blank policy so that no information can be written on it.

A lock lever 64 (FIGS. 2 and 3) pivotally mounted at 65 to the frame of the unit has a forward stop surface 67 normally adapted to be positioned behind a rear hook 66 depending from masking plate 31 to prevent the masking plate 31 to be moved back by hand. The rear edge of the lock lever 64 has a cam edge 68 adapted to be actuated to allow the lock lever 64 to swing upwardly to move its front stop portion 67 out of the path of the masking plate 31 and permit rearward movement of the plate when the machine is operated. A suitable abutment 69 limits the pivotal movement of the lock lever 64.

The movement of the masking plate 31 is controlled by a hook mechanism, generally designated by the reference numeral 35, comprising a stationary hook member 36 and a movable hook member 37 (FIG. 4). The stationary hook member 36 is pivotally mounted at 38 to the frame of the unit and has a front cam edge 39 and a front holding notch 40 behind cam edge 39. The rear end of the stationary hook member 36 is biased downwardly by spring 41 so that the front cam edge 39 is biased upwardly. Stop member 42 limits the pivoted movement of hook member 36.

The movable hook member 37, shown in detail in FIG. 10, comprises a front cam surface 43 with a holding notch 44 and is pivotally mounted at 45 to an upstanding ear 46 on carriage 47 which is journalled for sliding movement on rod 48 by upstanding ears 49. The rear end of the novable hook member 37 is biased downwardly by a spring 50 so that its front cam edge 43 is normally biased upwardly. The top edge of the movable hook member 37 has a release button 51 in the form of a platform which extends over the top edge of stationary hook member 36 when the movable hook member 37 is in its retracted position (FIG. 2) and which is adapted to be depressed by the user to move both hook members 36 and 37 downwardly around pivots 38 and 45, respectively, to release the masking plate 31 for forward motion as will be more fully discussed hereinbelow. Carriage 47 has a tongue 52 extending into a slot 53 in the frame to limit the movement of the movable hook member 37.

The carriage 47 on which movable hook member 37 is mounted is connected to an actuating coin slide 55 of a coin chute 56 through the intermediation of two-arm lever 57, pivotally mounted on the frame at 58 and having an arm 59 to which carriage 47 is mounted, push-pull rod 60 mounted on the other arm 61 of the two-arm lever 57, and slide extension plate 62 to which the push-pull rod 60 is mounted.

The coin chute 56 may be of any desired construction such as the structure shown in Patent Nos. 2,053,503, 2,049,597, 1,992,642 and 2,026,921 wherein the coin slide 55 will be released for forward movement only when coins are deposited in coin sockets 63 and wherein at other times the coin slide 55 is locked against inward motion.

Thus when coins are deposited the coin sockets 63 and the coin slide 55 is pushed inwardly, the push-pull rod 60 will pivot two-arm lever 57 around pivot 58 to move the movable hook member 37 forward. This forward movement of movable hook member 37 will permit its cam surface 43 to act on and raise cam surface 68 of lock lever 64 so that the front stop portion 67 is depressed below the rear hook 66 of masking plate 31 to release the masking plate 31 for rearward movement. Hook 37 is moved forward until the rear hook 66 of masking plate 31 enters notch 44 in movable hook member 37. Then the cam slide 55 is pulled out to pivot two-arm lever 57 in the opposite direction thereby pulling back movable hook member 37 which carries with it the masking plate 31. The masking plate 31 is pulled back until its rear hook 66 enters into the notch 40 in the stationary hook member 36 in which position the masking plate 31 is held in its rear policy-exposing position. This enables the purchaser to write his name, address, etc. on the exposed policy 1. After the user has written the pertinent information on the policy 1, the release button 51 is depressed which lowers both hook members 36 and 37 and moves notches 40 and 41 below the rear hook 66 of masking plate 31 so that the plate 31 is now free to move forward under tension of a spring 70 to its forward policy-masking position.

As stated above, means are provided for ejecting the written policy from the machine and for positioning a new policy beneath window 12 when the masking plate 31 is moved forward. This comprises a slidable rack 80 which has teeth 81 on its underside to cooperate with a ratchet 82 mounted fast on front wheel axis 15 (FIGS. 3, 5, 7 and 8) and to move the front wheels 8 in a clockwise direction when the rack 80 is moved forward by spring 86. The teeth 81 of rack 80 face forwardly to cooperate positively with toothed ratchet 82 which has rearwardly facing teeth. Thus the rack 80 can be moved rearwardly without disturbing the ratchet 82 but cannot move forwardly unless the front wheels 8 and associated ratchet 82 are rotated in a clockwise direction. A suitable stop pawl 83 cooperates with the ratchet 82 from underneath to prevent counter-clockwise rotation of the front wheels 8. The rack 80 has an upwardly extending rear hook portion 84 adapted to cooperate with a front hook 85 extending downwardly from exposing plate 31 so that the rack 80 is pulled back when the exposing plate 31 is moved back.

One of the front wheels 8 (preferably the wheel adjacent the rack 80) has a stop pin 90 extending therefrom which cooperates with a limit lever 91 which is biased rearwardly by spring 92 as shown in FIG. 9. The stop lever 91 is pivoted at 93 to the frame 29 and has an upper platform 94 extending at right angles thereto into the path of the front hook 85 of masking plate 31. The limit lever 91 has a first limit stop 95 and a second limit stop 96 offset from the first limit stop 95. The pin 90 normally abuts against second limit stop 96 (FIG. 14) while the masking plate 31 is in its rearward position. However, when the masking plate 31 is moved forward, front hook 85 strikes platform 94 to swing the limit lever 91 forward (FIG. 15) so that the second limit stop 96 is moved clear of the stop pin 90 thus releasing the front wheels 8 for rotation and permitting the spring 86 to move rack 80 forward to thereby rotate the front wheel 8 in a clockwise direction through the ratchet 82. The front wheels 8 and the stop pin 90 make one revolution to eject the written policy and to position a blank policy under the window 12. The stop pin 90 then strikes the first limit stop 95 (FIG. 13) on limit lever 91 and rotation of the wheels stop. When the masking plate 31 is then pulled back to its exposing position the platform 94 is released so that its spring 92 moves it to the position shown in FIG. 14 when the first limit stop 95 is out of the path of stop pin 90 and the front wheels 8 are permitted to rotate slightly to place the stop pin 90 in the locked position beneath second limit stop 96 (FIG. 14) in which position they will remain until the masking plate 31 is again released and moved forward.

The operation of the present invention is obvious from the above description but will be recapitulated hereinbelow for convenience. Normally the parts are in a position shown in FIGS. 2 and 3 in which the masking plate 31 is in its forward position to close the window 12. The pivoted stop member 64 is tilted rearwardly so that its front stop surface 67 prevents the plate 31 from being moved back by hand. In addition the stop lever 91 is in the position of FIG. 13 with the pin 90 abutting against first limit stop 95.

When coins are deposited into the coin sockets 63 of coin chute 56 and the coin slide 55 is pushed inwardly, the two-arm lever 57 will move around pivot 58 as shown in FIG. 4, to move the movable hook member 37 forward, as shown in FIGS. 4 and 5. The cam surface 43 of the hook 37 will abut the cam surface 68 of the stop lever 64 to tilt the stop portion 67 thereof downwardly out of the way of rear hook 66 on masking plate 31. The movable hook portion 37 moves forward beneath the rear hook 66 of the masking plate 31 until the rear hook 66 enters notch 44.

When the coin slide 55 is pulled out (FIGS. 6 and 7), the two-arm lever 57 is pivoted in the opposite direction so as to pull the movable hook member 37, together with the masking plate 31, rearwardly until the rear hook 66 of the closing plate enters the notch 40 of the stationary hook member 36. This will not only uncover the policy 1 but also pulls back the rack 80 by cooperation of front hook 85 on masking plate 31 with upstanding hook 84 on rack 80. The stop lever 91, being released by the removal of pressure from its platform 94, will move slightly to move first limiting stop 95 out of the path of stop pin 90 and thus permit the wheels 8 to rotate until stop pin 90 strikes the second limit stop 96 (FIG. 14). Since the window 12 has now been exposed, the user will fill in the required information on the policy 1. When he has finished he depresses release button 51 of the hook mechanism 35 to release the rear hook 66 of masking plate 31 from the notches 40 and 44 of both stationary and movable hook members 36 and 37. This permits the spring 70 to pull the masking plate 31 forwardly to cover the window 12. When the front hook 85 of the masking plate 31 strikes the abutment 94 of the limit lever 91, it will pivot the lever 91 and move the second limit stop 96 out of the path of the pin 90 (FIG. 15). This releases front wheels 8 so that the spring 86 moves the rack 80 forwardly to rotate the front wheels 8 through ratchet 82. Thus the original copy 2 of the written policy is moved out of the machine through mouth 27, the carbon copy 3 is moved within the machine and a new policy is positioned beneath the masking plate 31.

It will thus be seen that the present invention provides an improved insurance vending mechanism which operates mechanically without requiring expensive maintenance and is inexpensive to manufacture and simple to operate.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An insurance vending mechanism comprising a window, means for positioning a policy beneath said window, a masking plate slidably mounted beneath said window, and movable between an exposing position and a masking position, a gripping mechanism movably mounted on said mechanism, means for moving the gripping mechanism in one direction to a plate-gripping position and for moving it in the opposite direction to pull said masking plate away from said window to an exposing position, and means for releasing the gripping means from said plate-gripping position to permit the masking plate to return to its masking position.

2. An insurance vending mechanism as claimed in claim 1, wherein said gripping mechanism comprises a hook mechanism for grasping said masking plate.

3. An insurance vending mechanism as claimed in claim 2, wherein said hook mechanism comprises a hook pivotally mounted on a slide plate and wherein said moving means move said slide plate to pull the masking plate to the exposing position.

4. An insurance vending mechanism as claimed in claim 3, wherein said hook mechanism also comprises a stationary plate gripping hook to hold the plate in its exposing position.

5. An insurance vending mechanism as claimed in claim 4, wherein said masking plate is spring biased toward its masking position when the masking plate is released by the hook mechanism.

6. An insurance vending mechanism as claimed in claim 5, wherein stop means are provided to prevent movement of the masking plate to its exposing position until the hook mechanism is actuated.

7. An insurance vending mechanism as claimed in claim 6, wherein policy control means are provided for moving the written policy away from the window and positioning a blank policy beneath the window when the masking plate is moved to masking position.

8. An insurance vending mechanism as claimed in claimed in claim 7, wherein said policy control means comprise a feed wheel rotatable by said movement of said masking plate to its masking position.

9. An insurance vending mechanism as claimed in claim 8, wherein said feed wheel has a ratchet which is operated by a spring pressed rack and wherein means are provided to release said rack for movement when the masking plate is moved to its masking position.

10. An insurance vending mechanism as claimed in claim 9, wherein a stop pin is provided on said feed wheel and a limit lever is pivotally mounted adjacent said stop pin and wherein said limit lever is pivoted when said masking plate is moved to the masking position to move the limit lever out of the path of the stop pin and permit movement of the rack to rotate the feed wheel.

11. An insurance vending mechanism as claimed in claim 10, wherein said limit lever has a first limit stop and a second limit stop and wherein said stop pin moves from a position abutting the first limit stop to a position abutting the second limit stop when the masking plate is moved to its exposing position.

12. An insurance vending mechanism as claimed in claim 1, wherein a feed wheel is provided for moving the written policy away from the window and positioning a blank policy beneath the window when the masking plate is moved to masking position, stop means to prevent rotation of said feed wheel, said stop means being rendered inactive by the movement of the masking plate to its masking position to permit rotation of the feed wheel.

13. An insurance vending mechanism as claimed in claim 12, wherein said feed wheel has a ratchet which is operated by a spring pressed rack and wherein said stop means prevent the rack from movement, said rack being released for movement when the masking plate is moved to its masking position.

14. An insurance vending mechanism as claimed in claim 13, wherein a stop pin is provided on said feed wheel and a limit lever is pivotally mounted adjacent said stop pin and wherein said limit lever is pivoted when said masking plate is moved to masking position to move the limit lever out of the path of the stop pin and permit movement of the rack to rotate the feed wheel.

15. An insurance vending mechanism as claimed in claim 14, wherein said limit lever has a first limit stop and a second limit stop and wherein said stop pin moves from a position abutting the first limit stop to a position abutting the second limit stop when the masking plate is moved to its exposing position.

References Cited in the file of this patent

UNITED STATES PATENTS 2,854,257    Williams _____ Sept. 30, 1958